United States Patent
Araki et al.

(10) Patent No.: US 6,784,608 B2
(45) Date of Patent: Aug. 31, 2004

(54) LIGHT-ABSORPTIVE ANTIREFLECTION FILTER, WITH PIGMENT CONTAINING LIGHT-ABSORPTIVE FILM AND ELECTROCONDUCTING THIN FILM, AND DEVICE USING SAME

(75) Inventors: Soya Araki, Aichi (JP); Takao Sumida, Aichi (JP); Masataka Yamashita, Aichi (JP); Hiroko Funahashi, Aichi (JP)

(73) Assignee: Sony Corporation, Tokyo (JP)

( * ) Notice: Subject to any disclaimer, the term of this patent is extended or adjusted under 35 U.S.C. 154(b) by 543 days.

(21) Appl. No.: 09/747,610
(22) Filed: Dec. 22, 2000
(65) Prior Publication Data
US 2001/0006324 A1 Jul. 5, 2001
(30) Foreign Application Priority Data
Dec. 22, 1999 (JP) .......................................... P11-363993
Sep. 6, 2000 (JP) ...................................... P2000-270688
(51) Int. Cl.$^7$ ............................................... H01J 31/00
(52) U.S. Cl. ...................................... 313/479; 313/480
(58) Field of Search ................................. 359/580, 582, 359/586; 252/582; 428/428, 437; 313/478, 479, 480, 112, 313

(56) References Cited

U.S. PATENT DOCUMENTS

| 5,667,880 | A | * | 9/1997 | Okaniwa | ..................... 428/212 |
| 5,691,044 | A | * | 11/1997 | Oyama et al. | .............. 428/216 |
| 5,942,319 | A | * | 8/1999 | Oyama et al. | .............. 428/216 |
| 2002/0022134 | A1 | * | 2/2002 | Fujino et al. | ............... 428/432 |
| 2002/0134966 | A1 | * | 9/2002 | Tahara et al. | .......... 252/299.61 |

FOREIGN PATENT DOCUMENTS

| EP | 0200452 | * | 5/1986 |
| EP | 0649160 | | 4/1995 |
| JP | 64-70701 | * | 3/1989 |
| JP | 2002-62403 | * | 2/2002 |
| WO | WO97/28467 | | 8/1997 |

* cited by examiner

Primary Examiner—Jay Patidar
(74) Attorney, Agent, or Firm—Sonnenschein, Nath & Rosenthal LLP

(57) ABSTRACT

A light-absorptive antireflection film comprising a light-absorptive film formed on a glass substrate containing pigment microparticles and having a physical thickness of not less than 10 nm and an antireflection multilayer film attenuating reflected light of incident light by interference of light, wherein at least one layer of the antireflection multi-layer film is an electroconductive thin film having a surface resistance of not more than 1000 Ω/□, and a display device including the same and methods of producing them.

27 Claims, 8 Drawing Sheets

BAKING

BAKING

LIGHT-ABSORPTIVE ANTIREFLECTION FILTER, WITH PIGMENT CONTAINING LIGHT-ABSORPTIVE FILM AND ELECTROCONDUCTING THIN FILM, AND DEVICE USING SAME

BACKGROUND OF THE INVENTION

1. Field of the Invention

The present invention relates to a light-absorptive antireflection film and a display device using the same, more particularly a light-absorptive antireflection film able to increase contrast and suitable for a cathode ray tube (CRT) or other display device using flat panel glass and a display device using the same as an antireflection film of the flat panel glass. Also, the present invention relates to a method of producing the above light-absorptive antireflection film and a display device.

2. Description of the Related Art

In recent years, progress has been made in flattening the outer surface of a face panel of a display device, for example, cathode ray tube. Generally, the face panel of a cathode ray tube is formed thicker at corner parts than at a center part so as to give implosion proofness. When the outer surface of the face panel of a cathode ray tube is flattened, the mechanical strength with respect to implosion of the cathode ray tube decreases compared with when the outer surface of the face panel is curved. Therefore, it is necessary to increase the difference of the panel thickness between the center part and the corner parts of the face panel so as to maintain the implosion-proofness of the cathode ray tube.

The contrast of a cathode ray tube is mainly determined by the light absorption of a panel glass and the reflectance of a phosphor screen with respect to outer light. In a conventional cathode ray tube, an increase of contrast has been sought by increasing the light absorption at the panel glass somewhat and decreasing the reflectance of the phosphor screen. However, along with flattening of the outer surface of the face panel, if a difference of transmittance arises corresponding to the difference of the panel thickness, the uniformity of the brightness deteriorates. Therefore, it becomes difficult to obtain optimum contrast at both the center and corner parts of the panel.

To deal with the above difficulty, the transmittance of the glass is made higher and absorbency of light is given to an antireflection film formed on the surface of the panel glass so as to make the total transmittance equal and obtain good contrast.

As this type of antireflection film, for example, a light-absorptive antireflection member having a two-layer structure of a light-absorptive film and a silica film and functions of prevention of reflection, absorbency of light, and electroconductivity (see Japanese Unexamined Patent Publication (Kokai) No. 9-156964) has been known. According to this light-absorptive antireflection member, the transmittance of the panel glass is increased for example from 50 percent to 80 percent, while the transmittance of the light-absorptive antireflection member in the visible light region is decreased for example from 80 percent to 50 percent. Due to this, even contrast is obtained when the transmittance of the panel glass is low and the transmittance of the light-absorptive antireflection member is high.

As a similar antireflection film, an electroconductive and light-attenuating antireflection coating film having a structure of glass/$SnO_2$ (tin oxide)/TiN (titanium nitride)/$SnO_2$/TiN/$SiO_2$ (silicon dioxide) (see Japanese National Patent Publication (Kohyo) No. 6-510382) etc. have been known.

However, according to the light-absorptive antireflection member described in the above Japanese Unexamined Patent Publication (Kokai) No. 9-156964, it is necessary to increase the total thickness of the light-absorptive antireflection member so as to decrease the transmittance of the light-absorptive antireflection member. Therefore, when the difference of refractive index between the panel glass and the light-absorptive film is large, light incident from a glass side is reflected at an interface of the glass and the light-absorptive film and the reflected light is again reflected at the glass surface etc., whereby the problem of the image appearing double or a ghost is seen occurs.

For example, in the case of a cathode ray tube, since light emitted from the phosphor screen is reflected at the interface of the glass and the light-absorptive film and the reflected light is reflected again at the phosphor screen, the image appears double. Particularly, according to the light-absorptive antireflection member described in the above Japanese Unexamined Patent Publication (Kokai) No. 9-156964, since nitrides of titanium, zirconium, or hafnium are preferably used as the light-absorptive film, the difference of refractive index between the panel glass and the light-absorptive film is large and a ghost often becomes a problem.

On the other hand, in the electroconductive light-attenuating type antireflection coating film disclosed in Japanese National Patent Publication No. 6-510382, by optimizing the refractive index and thickness of the first layer transparent film from the glass side, it is possible to attenuate the incident light from the glass surface side, but there are many demerits due to the increase of film configuration. For example, due to the increase of the number of processes, the production cost increases. Also, it is very difficult to obtain the optimal material for a thin layer having absorbency in consideration of wavelength dispersion of an optical constant. For example, it is not possible to design the material in consideration of the ratio of emission spectra of R (red), G (green) and B (blue) of the cathode ray tube.

In addition to the above, as a structure formed on the surface of the panel glass for the purpose of improving the display quality of a cathode ray tube, many have been proposed which have functions of prevention of reflection, adjustment of the transmittance of light, improvement of contrast by adjustment of the dispersion of wavelength of the transmitted light, and decrease of spurious radiation by control of the surface resistivity.

For example, Japanese Unexamined Patent Publication (Kokai) No. 6-208003 discloses an antireflection film of a multilayer structure comprising at least one layer containing a dye. Japanese Unexamined Patent Publication No. 10-21858 discloses an antireflection film of a multilayer structure able to improve contrast and prevent static electricity by inclusion of fullerene. Japanese Unexamined Patent Publication No. 4-334853 discloses an antireflection multilayer film of a multilayer structure formed on a surface of panel glass having a transmittance of not more than 50 percent and containing a dye or pigment and electroconductive filler.

In these antireflection films, each layer configuring the antireflection film is formed by spin coating, dip coating, or other wet-coating. Therefore, sometimes sufficient uniformity of film quality and surface hardness cannot be obtained. Also, when an electroconductive filler is added for giving electroconductivity to the antireflection film, it is necessary to disperse the electroconductive filler at a high concentration for increasing the electroconductivity and the problems of aggregation of the electroconductive filler etc. occur.

As explained above, no antireflection film able to give a high effect in all of antireflection, improvement of contrast, and decrease of spurious radiation has been realized.

SUMMARY OF THE INVENTION

An object of the present invention is to provide a light-absorptive antireflection film having an antireflection function and electroconductivity able to improve contrast.

Another object of the present invention is to provide a display device improved in a display quality.

A still other object of the present invention is to provide methods of producing the above light-absorptive antireflection film or a display device using the same by a simple process and able to prevent an increase of the production cost.

According to a first aspect of the present invention, there is provided a light-absorptive antireflection filter allowing light incident from a first surface side to pass at a predetermined transmittance and attenuating reflected light of the incident light from a second surface side by interference of light at an antireflection multilayer film, said light-absorptive antireflection filter characterized by comprising a light-absorptive film formed on the first surface and containing pigment microparticles; the antireflection multilayer film formed on the second surface and contacting the light-absorptive film; and at least one electroconductive thin film included in the antireflection multilayer film.

Preferably, a physical thickness of the light-absorptive film is at least about the size of the pigment microparticles and set within a range wherein a quality of the light-absorptive film becomes uniform.

According to a second aspect of the present invention, there is provided a display device comprising a display unit displaying an image and a light-absorptive antireflection multilayer film formed on the display unit, allowing light incident from a first surface side of the display unit side to pass at a predetermined transmittance, and attenuating reflected light of the incident light from a second surface side; said light-absorptive antireflection multilayer film comprising a light-absorptive film formed on the first surface and containing pigment microparticles, an antireflection multilayer film formed on the second surface and contacting the light-absorptive film, and at least one electroconductive thin film included in the antireflection multilayer film.

Preferably, a surface of the display unit is substantially flat.

In the light-absorptive antireflection film and display device using the same of the above configuration, by making the light-absorptive film contain pigment microparticles and selecting a suitable type and blending ratio of pigment microparticles, it is possible to control a transmittance and wavelength dispersion of the transmittance freely. As a result, a selective absorption filter considering the RGB brightness of a display device can be achieved. Also, the antireflection multilayer film attenuating reflected light of the incident light by interference of light and decreases spurious radiation since at least one layer is comprised of an electroconductive thin film.

According to the light-absorptive antireflection film of the present invention, it is possible to prevent reflection and decrease spurious radiation and, further, it becomes easy to control the transmittance of the light-absorptive antireflection film.

According to the display device of the present invention, it is possible to prevent reflection of a display unit and decrease spurious radiation and, further, it becomes possible to obtain a high contrast.

According to a third aspect of the present invention, there is provided a method of producing a light-absorptive antireflection film of the present invention comprising the steps of coating a solution containing pigment microparticles and a solvent; drying off the solvent to form a light-absorptive film containing the pigment microparticles and having a predetermined transmittance; and forming by physical vapor deposition (PVD) on the light-absorptive film an antireflection multilayer film including at least one electroconductive thin film and attenuating reflected light of incident light by interference of light.

Preferably, the PVD method comprises a sputtering method.

According to the above aspect of the present invention, there is provided a method of producing a display device of the present invention comprising the steps of: coating on a display unit displaying an image a solution containing pigment microparticles and a solvent; drying off the solvent to form a light-absorptive film containing the pigment microparticles and having a predetermined transmittance; and forming by physical vapor deposition (PVD) on the light-absorptive film an antireflection multilayer film including at least one electroconductive thin film and attenuating reflected light of the incident light by interference of light.

Preferably, the PVD method comprises a sputtering method.

According to the above method of producing the light-absorptive antireflection film of the present invention, the light-absorptive film containing pigment microparticles is formed by wet-coating and the antireflection multilayer film is formed by for example sputtering. Therefore, it is possible to produce a light-absorptive antireflection film including a light-absorptive film containing dispersed pigment microparticles and controlled in a transmittance by a simple production process at a low cost. Further, according to the method of producing a display device of the present invention, it is possible to produce a display device having the functions of prevention of reflection and decreasing spurious radiation and able to improve contrast by a simple production process at a low cost.

BRIEF DESCRIPTION OF THE DRAWINGS

These and other objects and features of the present invention will become clearer from the following description of the preferred embodiments given with reference to the accompanying drawings, in which:

FIG. 2A is a cross-sectional view of a process of forming the light-absorptive film part of FIG. 1, while

DESCRIPTION OF THE PREFERRED EMBODIMENTS

Below, embodiments of the light-absorptive antireflection film, display device, and methods of producing the same of the present invention will be explained in detail with reference to the drawings.

First Embodiment

Figure 1:
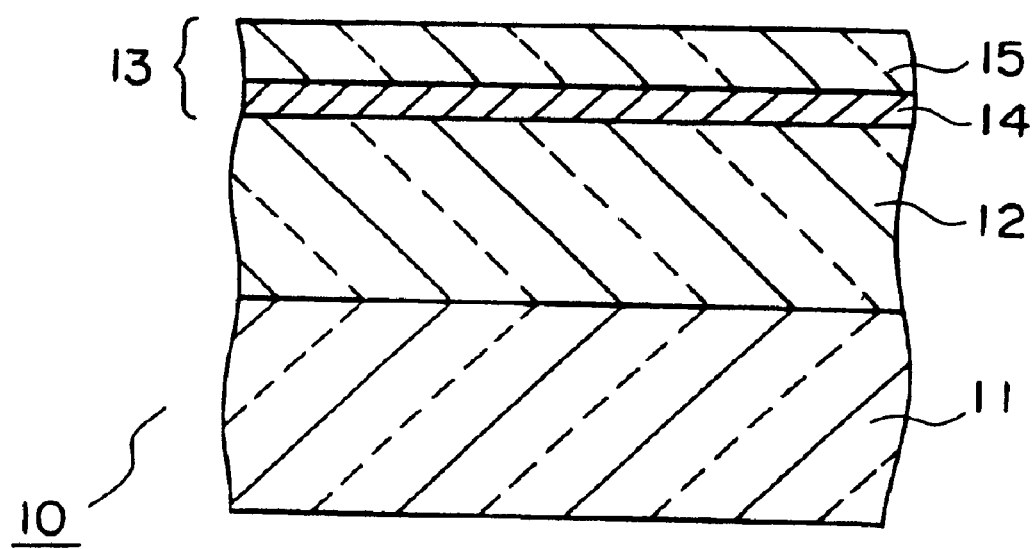
FIG. 1 is a cross-sectional view of a light-absorptive antireflection film according to a first embodiment of the present invention.

FIG. 1 is a cross-sectional view of the structure of a light-absorptive antireflection film of the present embodiment.

The light-absorptive antireflection film 10 of the present embodiment has a configuration comprising a light-absorptive film 12 formed on a glass substrate 11, containing pigment microparticles, and having a physical thickness of not less than 10 nm and not more than 1000 nm, preferably not less than 100 nm and not more than 800 nm, and an antireflection multilayer film 13 formed on the light-absorptive film 12 and attenuating reflected light of incident light by interference of light.

Figure 2A:
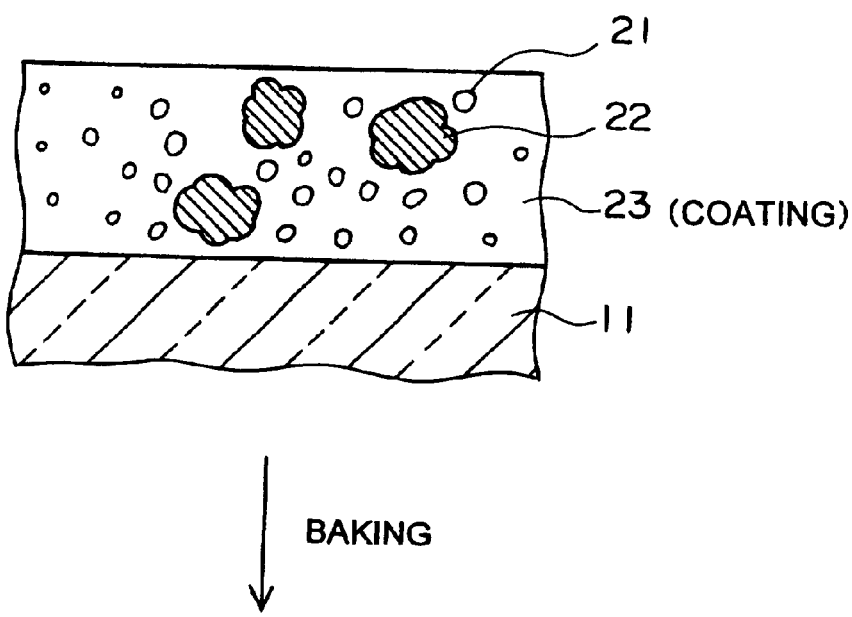
Figure 2B:
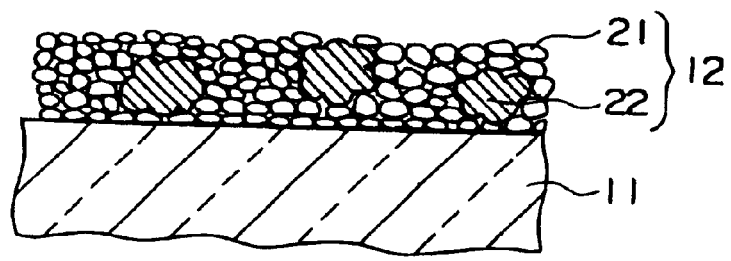
FIG. 2B is an enlarged cross-sectional view of the light-absorptive film 12 of FIG. 1.

FIG. 2 shows the structure of the light-absorptive film. The light-absorptive film 12 is formed by coating an Si alkoxide solvent mainly comprised of silica ($SiO_2$) and containing pigment microparticles in ethanol or another organic solvent to form a uniform dispersion so as to give a desired distribution of transmittance on the surface of the glass substrate 11 (see FIG. 2A) and then baking it at a predetermined temperature t (for example $t \geq 120°$ C.) (see FIG. 2B).

As the pigment microparticles, microparticles of an inorganic pigment of for example carbon microparticles (carbon black) or a compound of iron, cobalt, manganese, tin, ruthenium, etc. or microparticles of an organic pigment comprised of an organic substance can be used.

Since the size of the particles of the pigment in the organic solvent becomes 10 nm even at the smallest, a film thickness of 10 nm or more is required for forming a uniform film. Also, when using an organic pigment, the particle size in the state wherein the pigment is aggregated (secondary size) sometimes becomes 50 nm or more. Therefore, a film thickness at 100 nm or more is required so as to form a more stable light-absorptive film.

On the other hand, a film thickness at 1000 nm or more is not preferable due to the possibility of cracks in the surface after forming the film and drying it. When the thickness is 800 nm or less, long-term stability is confirmed independently of the structure of the top layer antireflection multilayer film, method of formation, and storage method.

In the light-absorptive antireflection film 10 shown in FIG. 1, the thickness of the light-absorptive film 12 is for example 10 nm. Also, the refractive index of the light-absorptive film 12 is near the refractive index of the glass substrate 11, that is, not less than 1.40 and not more than 1.65, preferably not less than 1.45 and not more than 1.55. Further, the reflectance at an interface of the antireflection multilayer film 13 and the light-absorptive film 12 with respect to incident light from the surface of the light-absorptive antireflection film 10, that is, an antireflection multilayer film 13 side, is made not more than 1.0 percent. Due to this, light reflected at an interface of the antireflection multilayer film 13 and the light-absorptive film 12 does not influence the interference of light at the antireflection multilayer film 13, and the antireflection function of the antireflection multilayer film 13 does not deteriorate.

As a method of forming the coated light-absorptive film 12, for example, wet coating is employed. In wet coating, spin coating is most suitable for obtaining a uniform thickness. In addition to spin coating, roll coating, bar coating, dip coating, spray coating, etc. can be used. Note that the present invention is not limited to these methods of formation.

On the light-absorptive film 12 described above is formed an antireflection multilayer film 13. The antireflection multilayer film 13 includes at least one layer of an electroconductive thin film. The surface resistance of the electroconductive thin film is made for example not less than 50 $\Omega/\square$ and not more than 1000 $\Omega/\square$. As the electroconductive thin film, for example, a thin film having a high transmittance of light such as indium-tin oxide (ITO), tin oxide ($SnO_2$), zinc oxide ($ZnO_x$), a transition metal nitride having light absorbency such as titanium nitride (TiN) and niobium nitride (NbN), and a metal like silver (Ag) or Ni-Fe (nickel-iron alloy) is used.

FIG. 1 shows an example of the simplest two-layer structure of the antireflection multilayer film 13 wherein a TiN film 14 is formed as the electroconductive thin film. For the first layer of the antireflection multilayer film 13 on the light-absorptive film 12, the TiN film 14 is formed at a physical thickness of for example 12 nm. For the second layer of the antireflection multilayer film 13, a $SiO_2$ film 15 having a refractive index of not more than 1.52, for example 1.52, is formed at a physical thickness of 70 to 110 nm, for example 85 nm. The $SiO_2$ film 15 becomes the outermost layer of the light-absorptive antireflection film 10.

As the method of forming the antireflection multilayer film 13, for example, direct current (DC) active sputtering is employed. DC active sputtering is suitable for obtaining a distribution of a uniform thickness over a large area. Also, by employing a simple configuration of films, it is possible to raise the productivity of manufacture.

The sputtering apparatus for forming the antireflection multilayer film 13 is an in-line type and is comprised of a load lock chamber for loading the substrate, a first film forming chamber using a mixed gas of nitrogen and argon as a reaction gas and provided with a metal titanium target, an isolation chamber having a gas replacement function, a second film forming chamber using a mixed gas of oxygen and argon as a reaction gas and provided with a metal silicon target, and a load lock chamber for unloading the substrate.

All of the sputtering is performed in an atmosphere controlled in pressure to 0.1 to 1 Pa. Note that, in addition to sputtering, it is also possible to form the antireflection multilayer film 13 by wet coating of for example the sol-gel process. Note that sputtering is preferable so as to obtain an electroconductive thin film having a surface resistance of not more than 1000 $\Omega/\square$ (for example, the TiN film 14). Also, by a sputtering process, it is possible to form an antireflection multilayer film 13 having a uniform quality and a high surface hardness. Therefore, it is possible to improve the scratch resistance of the light-absorptive antireflection film 10.

Further, it is also possible to form the antireflection multilayer film 13 by vacuum evaporation or ion plating. The method of forming the light-absorptive antireflection film of the present invention is not limited to the above film forming methods.

Figure 3:
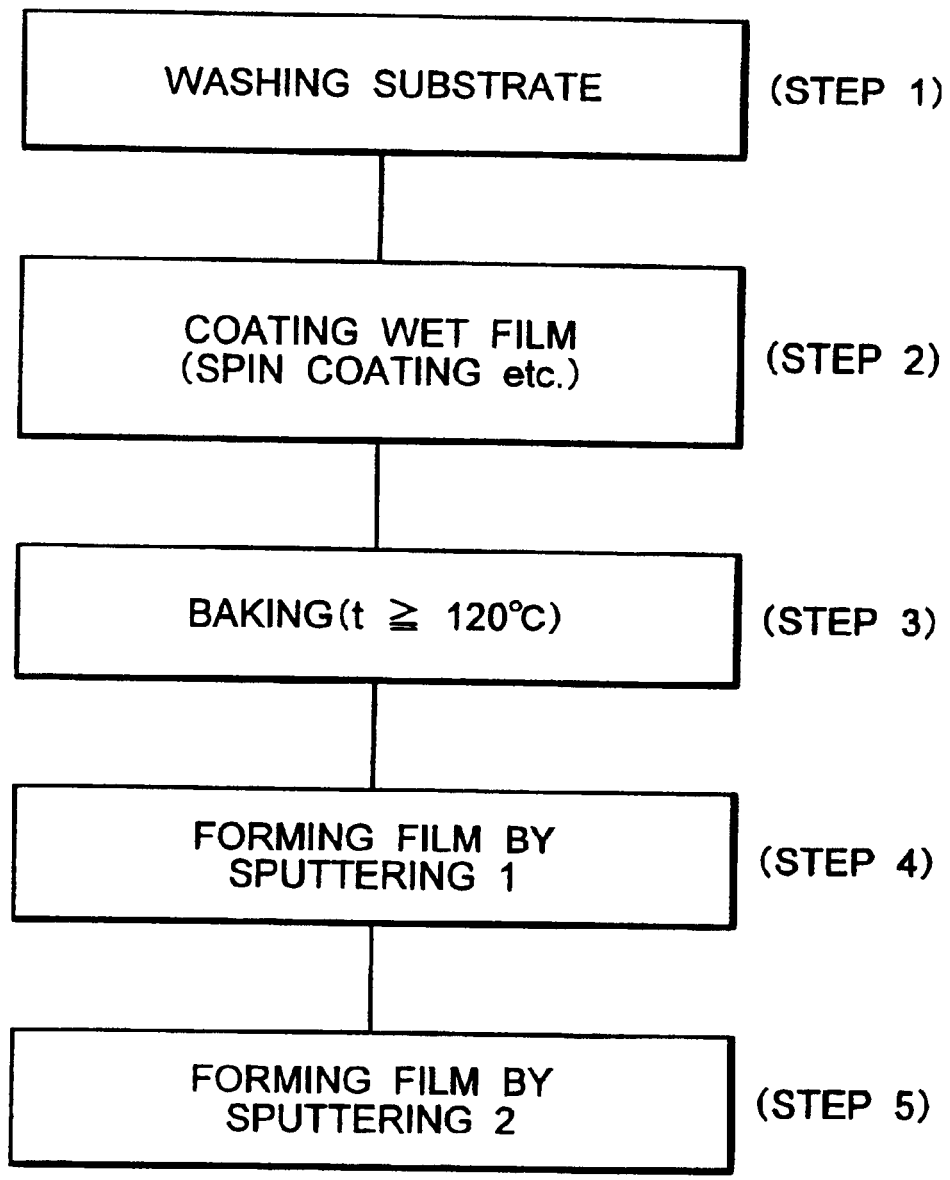
FIG. 3 is a flow chart of the production process of a light-absorptive antireflection film according to the first embodiment of the present invention.

FIG. 3 shows the flow of the production process of a light-absorptive antireflection film 10 according to the present embodiment. First, the surface of a glass substrate 11 is washed (step 1). Next, a light-absorptive film 12 is coated on the glass substrate 11 by spin coating etc. (step 2), then the coated film is baked at a predetermined temperature t (for example, t≧120° C.) (step 3). Then, by sputtering, first, the TiN film 14 of the first layer of the antireflection multilayer film 13 is formed (step 4), next, the $SiO_2$ film 15 of the second layer of the antireflection multilayer film 13 is formed (step 5).

In the light-absorptive antireflection film 10 of the above configuration according to the present embodiment, due to the film configuration of the three-layer structure comprised of the first layer of the light-absorptive film 12, the second layer of the TiN film 14 (electroconductive thin film), and the third layer of the $SiO_2$ film 15, it is possible to suppress reflection of incident light from a glass substrate 11 side (below, also referred to as back incident light). Also, since a pigment is added into the light-absorptive film 12, when the light-absorptive antireflection film 10 is used as an antireflection film of a face panel of for example a display device, a selective absorption filter considering the RGB brightnesses can be achieved.

Figure 4:
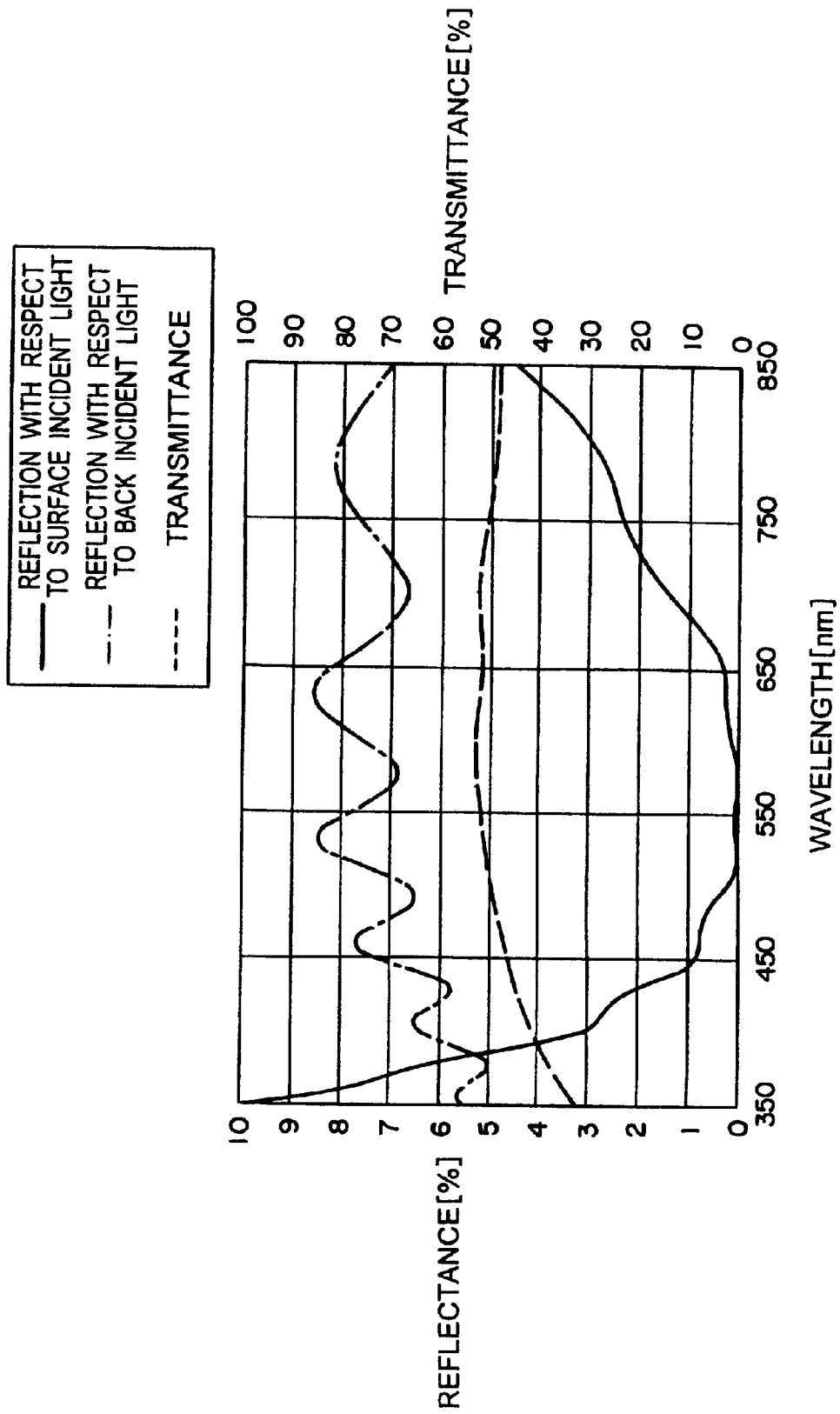
FIG. 4 is a distribution chart of reflectance with respect to surface incident light, reflectance to back incident light, and transmittance of the light-absorptive antireflection film according to the first embodiment of the present invention.

FIG. 4 shows distributions of a reflectance with respect to incident light from a surface side (below, also referred to as surface incident light), a reflectance with respect to the back incident light, and a transmittance in the above configuration according to the present embodiment. As clear from the distribution, the transmittance with respect to light of a wavelength of a region with a high luminosity of visible light (not less than 450 nm and not more than 650 nm) is at least about 40 percent. Almost no change of the transmittance due to the wavelength is seen. The transmittance of the light-absorptive antireflection film can be controlled freely within a range of for example about 95 to 40 percent by adjusting the type and content of the pigment in the light-absorptive film 12 of the first layer. Therefore, it is possible to easily control the distribution of transmittance compared with an antireflection film comprised of only sputtering films not containing pigment.

Also, in the light-absorptive antireflection film of the present embodiment, the light intensity of light incident from the glass substrate 11 side (back incident light) is attenuated due to absorption of light at the light-absorptive film 12. Due to this, the reflectance at an interface of the light-absorptive film 12 and the antireflection multilayer film 13 is controlled at not more than 10 percent with respect to the back incident light. The reflectance can be adjusted by, for example, changing the composition of the light-absorptive film 12.

When reflection of 10 percent or more with respect to the back incident light is generated at the interface of the light-absorptive film 12 and the antireflection multilayer film 13, the reflected light again strikes the phosphor screen (or a surface of the glass substrate 11 not at a side of the light-absorptive film 12) and a ghost is seen. To prevent this, the reflectance is always kept at not more than 10 percent.

Further, when the reflectance is 5 percent, regardless of the wavelength of the incident light, no ghost is observed, therefore a more preferable characteristic can be obtained. This is confirmed in the panel glass of a cathode ray tube.

Also, since silica is used as a main material of the light-absorptive film 12 and further the outermost layer of the light-absorptive antireflection film 10 is a sputtering film, the light-absorptive antireflection film of the present embodiment has a sufficient mechanical strength. Therefore, the light-absorptive antireflection film of the present embodiment particularly has a high scratch resistance and is beneficial for surface treatment performed at the outermost surface of a cathode ray tube or other display device.

Further, since the light-absorptive film 12 is formed by wet coating, it is possible to add any pigment easily. Therefore, by addition of a pigment selectively absorbing light of a specific wavelength region, light-selective absorbency can be achieved. Also, by addition of a plurality of types of pigments and adjustment of the blending ratio of each pigment, it is also possible to control the wavelength distribution of the transmittance of light.

Also, since the light-absorptive film 12 is formed by low cost wet coating and the antireflection multilayer film 13 including the electroconductive thin film is formed by sputtering, it is possible to realize a selective light-absorbent film of low reflection and low spurious radiation. The light-absorptive antireflection film of the present embodiment satisfies the TCO (The Swedish Central Organization of Salaried Employees) standard of electromagnetic waves etc. radiated from a display.

Also, by employing a system comprised of $TiN/SiO_2$ for the sputtering films, the surface treatment becomes lower in cost.

Second Embodiment

Figure 5:
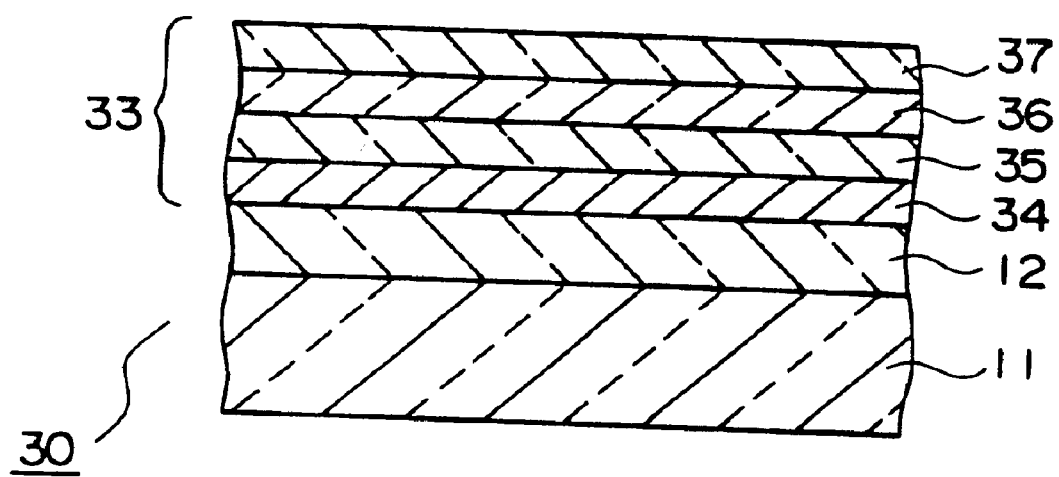
FIG. 5 is a cross-sectional view of the light-absorptive antireflection film according to the second embodiment of the present invention.

Next, an example of an antireflection multilayer film of a four-layer structure is shown. FIG. 5 is a cross-sectional view of a light-absorptive film 30 of the present embodiment. As shown in FIG. 5, in the same manner as the first embodiment, a light-absorptive film 12 is formed on a glass substrate 11 at a thickness of for example 100 nm. An antireflection multilayer 33 of a four-layer structure is formed on this. As the antireflection multilayer film 33, a system comprised of $ITO/SiO_2/TiO_2/SiO_2$ is employed.

According to the light-absorptive antireflection film 30 of the present embodiment, for the first layer of the antireflection multilayer film 33, as an electroconductive film, for example an ITO film 34 is formed at a physical thickness of 30 nm. For the second layer of the antireflection multilayer film 33, a $SiO_2$ film 35 is formed at a physical thickness of 16 nm. For the third layer of the antireflection multilayer film 33, a titanium oxide ($TiO_2$) film 36 is formed at a physical thickness of 90 nm. For the fourth layer of the antireflection multilayer film 33, a $SiO_2$ film 37 of the outermost layer of the light-absorptive antireflection film 30 is formed at a physical thickness of 80 nm.

For forming the light-absorptive antireflection film of the present embodiment, first, in the same manner as the first embodiment, a light-absorptive film 12 is formed by wet coating. After this, an ITO film 34, $SiO_2$ film 35, $TiO_2$ film 36, and $SiO_2$ film 37 of the antireflection multilayer film 33 are sequentially formed by for example sputtering.

Figure 6:
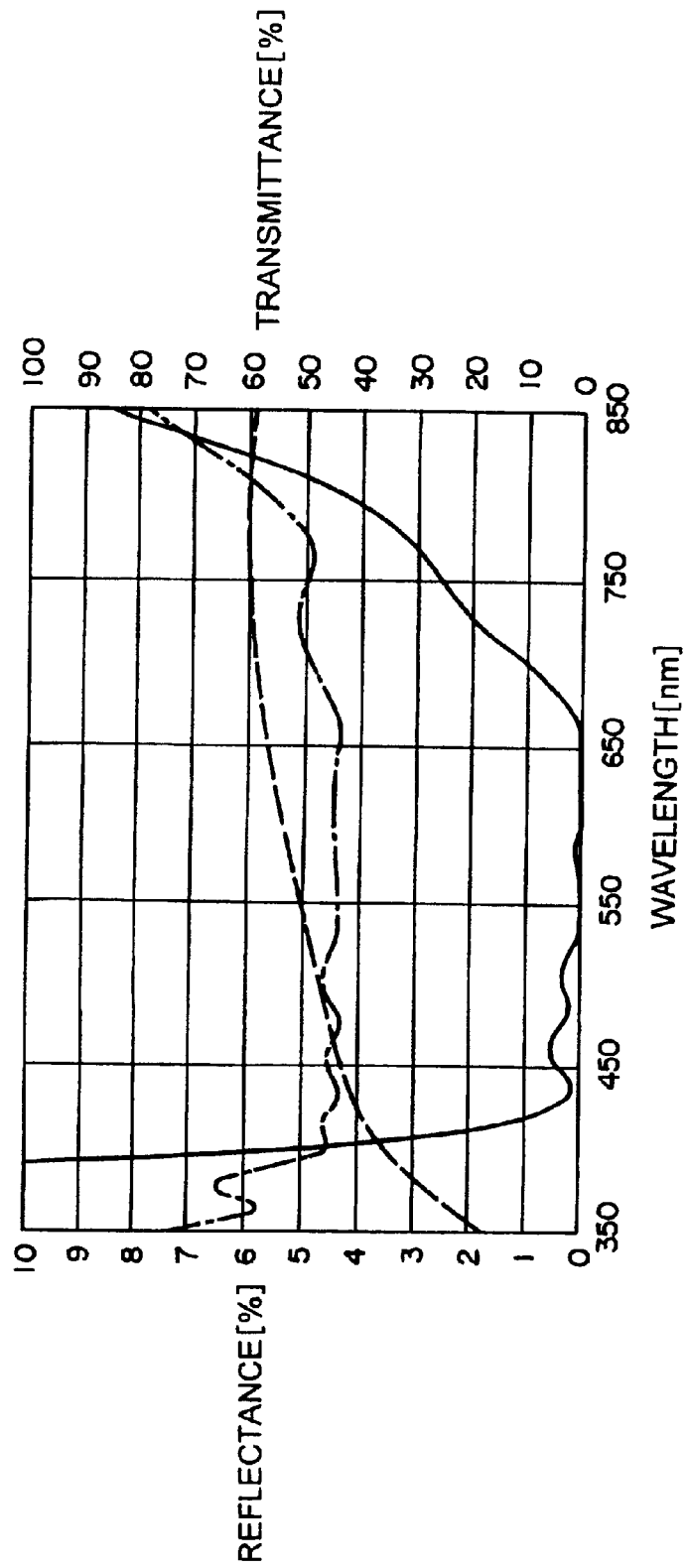
FIG. 6 is a distribution chart of reflectance with respect to surface incident light, reflectance to back incident light and transmittance of the light-absorptive antireflection film according to a second embodiment of the present invention.

FIG. 6 shows wavelength distributions of a reflectance with respect to surface incident light, a reflectance with respect to the back incident light, and a transmittance in the light-absorptive antireflection film of the above configuration. As shown in FIG. 6, the light-absorptive antireflection film of the present embodiment also has functions of prevention of reflection, control of transmittance, and control of wavelength distribution of passing light. By the decrease of the transmittance with respect to visible light to not more than 50 percent, it becomes possible to improve contrast in a display device using panel glass having a high transmittance. Also, according to the light-absorptive antireflection film 30 of the present embodiment, since the ITO film 34 is formed as an electroconductive thin film, the surface resistance is low and the spurious radiation is decreased.

Further, when comparing FIG. 6 with FIG. 4 of the first embodiment, it is found that the reflectance is decreased in a broader region of wavelength according to the light-absorptive antireflection film of the present embodiment. However, since two layers of sputtering films are added, the process flow becomes complicated. Therefore, the configuration of the light-absorptive antireflection film is suitably selected in accordance with the characteristics required for the antireflection film.

Third Embodiment

Figure 7:
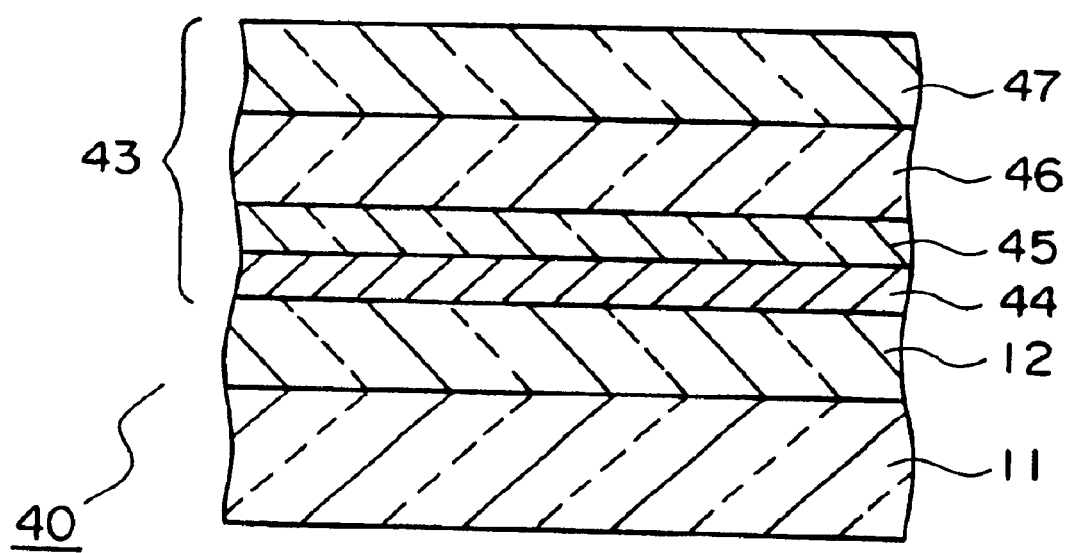
FIG. 7 is a cross-sectional view of the light-absorptive antireflection film according to a third embodiment of the present invention.

The light-absorptive antireflection film of the present embodiment is an example of use of a magnesium fluoride (MgF) film for the outermost layer. FIG. 7 is a cross-sectional view of the light-absorptive antireflection film 40 of the present embodiment. As shown in FIG. 7, a light-absorptive film 12 is formed on a glass substrate 11 at a thickness of for example 100 nm. An antireflection multilayer film 43 of a four-layer structure is formed on this. As the antireflection multilayer film 33, a system comprised of $ITO/SiO_2/TiO_2/MgF$ is employed.

According to the light-absorptive antireflection film 40 of the present embodiment, for the first layer of the antireflection multilayer film 43, for example an ITO film 44 is formed as an electroconductive film at a physical thickness of 30 nm. For the second layer of the antireflection multilayer film 32, a $SiO_2$ film 45 is formed at a physical thickness of 16 nm. For the third layer of the antireflection multilayer film 43, a $TiO_2$ film 46 is formed at a physical thickness of 90 nm. For the fourth layer of the antireflection multilayer film 43, a MgF film 47 of the outermost layer of the light-absorptive antireflection film 40 is formed at a physical thickness of 100 nm.

The light-absorptive antireflection film of the present embodiment is the same as the light-absorptive antireflection film of the second embodiment except that the MgF film 47 is formed in place of the $SiO_2$ layer at the outermost layer of the antireflection multilayer film 43.

For forming the light-absorptive antireflection film 40 of the present embodiment, in the same manner as the second embodiment, after forming the light-absorptive film 12 on the glass substrate 11 by wet coating, an ITO film 44, $SiO_2$ film 45, $TiO_2$ film 46, and MgF film 47 of the antireflection multilayer film 43 are sequentially formed by for example sputtering.

The light-absorptive antireflection film 40 of the present embodiment, in the same manner as the light-absorptive antireflection film of the second embodiment, has the functions of prevention of reflection, control of transmittance, and control of the wavelength distribution of passing light. Due to this, it becomes possible to improve the contrast in a display device using panel glass having a high transmittance too. Also, according to the light-absorptive antireflection film 40 of the present embodiment, since the ITO film 44 is formed as an electroconductive thin film, the surface resistance is low and the spurious radiation is decreased.

Fourth Embodiment

Figure 8:
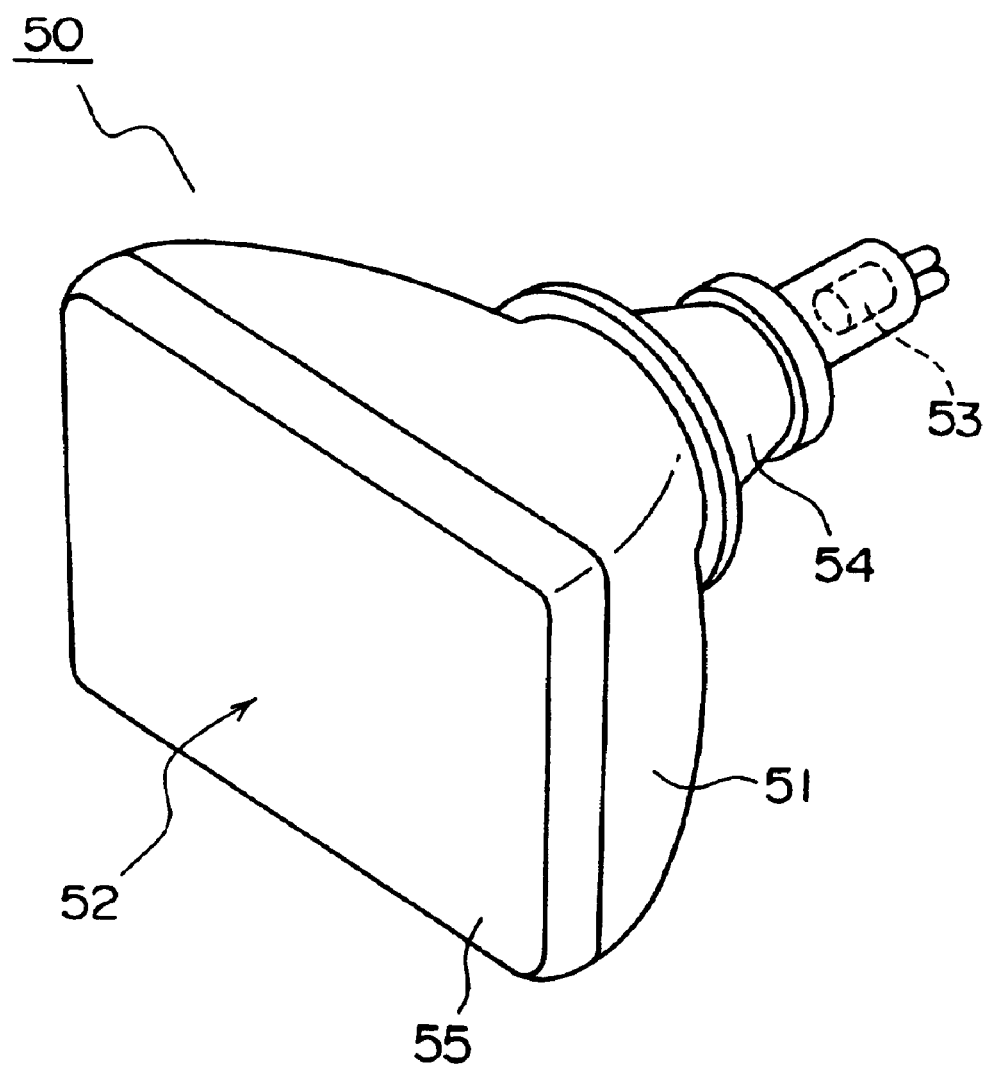
FIG. 8 is a schematic perspective view of a cathode ray tube according to a fourth embodiment of the present invention.

FIG. 8 is a schematic perspective view of a display device, for example, a cathode ray tube, according to the present invention. In the cathode ray tube 50 of FIG. 8, panel glass 52 provided with a phosphor screen is fit at the opening or inside surface of a picture tube bulb 51. An electron gun 53 generating an electron beam is sealed in a rear end of the picture tube bulb 51. A deflection yoke 54 deflecting the electron beam generated from the electron gun 53 is attached at the neck of the picture tube bulb 51.

In the cathode ray tube of the above configuration, the outer surface of the panel glass 52 is flat. As the panel glass 52, a material having a high transmittance is used. On the outer surface of the panel glass 52, an antireflection film 55 is formed for the purpose of improvement of contrast. As the antireflection film 55, the light-absorptive antireflection film as shown in the first through third embodiments described above is used.

Next, a method of forming the antireflection film 55 on the outer surface of the panel glass 52 will be explained. Here, since the light-absorptive antireflection film 10 shown in the first embodiment is used as the antireflection film 55, the following explanation will be given with reference to FIG. 1. The panel glass 52 of FIG. 8 corresponds to the glass substrate 11 of FIG. 1.

For forming the light-absorptive film 12 on the outer surface of the panel glass 52 (glass substrate 11), in the same manner as the first embodiment, first a Si alkoxide solvent mainly comprised of $SiO_2$ and containing pigment microparticles in an organic solvent to form a uniform dispersion so as to give a desired distribution of transmittance is coated on the surface of the panel glass 52. As the pigment microparticles, microparticles of an inorganic pigment of for example carbon microparticles (carbon black) or a compound of iron, cobalt, manganese, etc. or microparticles of an organic pigment comprised of an organic substance can be used. Also, as the organic solvent, for example ethanol etc. can be used.

After the Si alkoxide solvent is coated, it is baked at a predetermined temperature t (for example $t \geq 120°$ C.). The light-absorptive film 12 is formed by this.

After this, in the same manner as the first embodiment, the TiN film 14 and the SiO2 film 15 configuring the antireflection multilayer film 13 are sequentially formed by for example DC active sputtering.

The panel glass 52 of the cathode ray tube is formed thin at a center part and thick at corner parts. When the panel glass 52 is made flat, it is necessary to increase the difference of panel thickness between the center part of the panel glass 52 and the corner parts. There is the problem that, along with this, the brightness becomes uneven between the center part of the panel glass 52 and the corner parts.

To deal with the above problem, according to the display device of the present embodiment described above, since panel glass 52 having a high transmittance is used, the unevenness of brightness due to the difference of the panel thickness is decreased. Also, since an antireflection film 55 controlled to a low transmittance is formed on the panel glass 52, a high contrast can be obtained. Further, due to interference of light at the antireflection multilayer film 13, an antireflection function can be obtained. Also, since at least one layer of the antireflection multilayer film 13 is an electroconductive thin film (TiN film 14), spurious radiation is decreased.

According to the display device of the present embodiment, by suitably selecting the type and blending ratio of the pigment added into the first layer of the antireflection film 55, that is, the light-absorptive film 12 of the light-absorptive antireflection film 10, it is possible to freely control the wavelength distribution of transmittance. Due to this, it is possible to design the antireflection film 55 in accordance with the ratio of RGB brightnesses of a cathode ray tube. Therefore, even when the ratio of RGB electric currents is optimized for the purpose of improvement of the focusing performance, it is possible to suitably correct the ratio of RGB brightnesses.

The embodiments of the light-absorptive antireflection film, display device, and methods of producing them of the present invention are not limited to the above explanation. For example, in the above embodiments, the case of applying a light-absorptive antireflection film to the flat panel glass of the cathode ray tube was shown, but in addition to cathode ray tubes, it is also possible to apply the present invention to a liquid crystal display (LCD), a field emission display (FED) emitting light in the same manner as a cathode ray tube, or other displays.

Also, when using a combination of different types of pigments, it is also possible to make the light-absorptive film a multilayer structure. Due to this, it is possible to prevent aggregation etc. of the pigment microparticles and uniformly disperse the pigment in the light-absorptive film.

Note that the present invention is not limited to the above embodiments and includes modifications within the scope of the claims.

What is claimed is:

1. A light-absorptive antireflection filter that allows incident light incident on a first surface side to pass at a predetermined transmittance and that attenuates reflected light of the incident light reflected from a second surface side by interference of light at an antireflection multilayer film, said light-absorptive antireflection filter comprising:

a light-absorptive film formed on the first surface side and containing pigment microparticles;

the antireflection multilayer film formed on the second surface side and contacting the light-absorptive film; and at least one electroconductive thin film included in the antireflection multilayer film.

2. A light-absorptive antireflection filter as set forth in claim 1, wherein a physical thickness of the light-absorptive film is at least about a size of the pigment microparticles and set within a range wherein a quality of the light-absorptive film becomes uniform.

3. A light-absorptive antireflection filter as set forth in claim 2, wherein the physical thickness of the light-absorptive film is about not less than 10 nm and not more than 1000 nm.

4. A light-absorptive antireflection filter as set forth in claim 3, wherein the physical thickness of the light-absorptive film is about not less than 100 nm and not more than 800 nm.

5. A light-absorptive antireflection filter as set forth in claim 3, wherein the light-absorptive film contains microparticles of an organic pigment.

6. A light-absorptive antireflection filter as set forth in claim 3, wherein the light-absorptive film contains microparticles of an inorganic pigment.

7. A light-absorptive antireflection filter as set forth in claim 2, wherein the physical thickness of the light-absorptive film is at least about a secondary size of aggregates of the pigment microparticles.

8. A light-absorptive antireflection filter as set forth in claim 1, wherein a surface resistance of the electroconductive thin film is about not less than 50 $\Omega/\square$ and not more than 1000 $\Omega/\square$.

9. A light-absorptive antireflection filter as set forth in claim 1, wherein the predetermined transmittance is controlled by selecting the type of the pigment microparticles and the ratio of blending it.

10. A light-absorptive antireflection filter as set forth in claim 9, wherein the predetermined transmittance is about not less than 40 percent and not more than 95 percent with respect to light of a wavelength between 450 nm to 650 nm.

11. A light-absorptive antireflection filter as set forth in claim 1, wherein a reflectance at an interface of the light-absorptive film and the antireflection multilayer film with respect to light incident from the first surface side, defined as a first reflectance, is set within a range wherein reflected light of the light incident from the first surface side at the interface does not form a ghost image visually discernable from the light incident from the first surface side at the first surface.

12. A light-absorptive antireflection filter as set forth in claim 11, wherein the first reflectance is about not less than 0.1 percent and not more than 10 percent.

13. A light-absorptive antireflection filter as set forth in claim 12, wherein the first reflectance is not more than about 5 percent.

14. A light-absorptive antireflection filter as set forth in claim 11, wherein a reflectance at the interface of the light-absorptive film and the antireflection multilayer film with respect to light incident from a second surface side, defined as a second reflectance, is set within a range wherein reflected light of the incident light from the second surface side at the interface substantially does not influence the interference of light at the antireflection multilayer film.

15. A light-absorptive antireflection filter as set forth in claim 14, wherein the second reflectance is not more than about 1.0 percent.

16. A light-absorptive antireflection filter as set forth in claim 15, wherein a refractive index of the light-absorptive film is about not less than 1.40 and not more than 1.65.

17. A light-absorptive antireflection filter as set forth in claim 16, wherein the refractive index of the light-absorptive film is about not less than 1.45 and not more than 1.55.

18. A light-absorptive antireflection filter as set forth in claim 1, wherein the electroconductive thin film contains a transition metal nitride film.

19. A light-absorptive antireflection filter as set forth in claim 1, wherein the electroconductive thin film contains a metal thin film.

20. A light-absorptive antireflection filter as set forth in claim 1, wherein the antireflection multilayer film has a silica film at the outermost layer of the second surface.

21. A light-absorptive antireflection filter as set forth in claim 20, wherein a refractive index of the silica film is not more than about 1.52 and a physical thickness of the silica film is about 70 to 110 nm.

22. A light-absorptive antireflection filter as set forth in claim 1, wherein the antireflection multilayer film has a magnesium fluoride film at the outermost layer of the second surface.

23. A light-absorptive antireflection filter as set forth in claim 22, wherein a refractive index of the magnesium fluoride film is not more than about 1.52 and a physical thickness of the magnesium fluoride film is about 70 to 110 nm.

24. A light-absorptive antireflection filter as set forth in claim 1, wherein the antireflection multilayer film includes a PVD (physical vapor deposition) film.

25. A light-absorptive antireflection filter as set forth in claim 24, wherein the antireflection multilayer film includes a sputtering film.

26. A display device comprising:

a display unit displaying an images; and a light-absorptive antireflection multilayer film formed on the display unit, the light-absorptive antireflection multilayer film allowing light incident on a first surface side of the display unit side to pass at a predetermined transmittance, and attenuating reflected light of the incident light reflected from a second surface side said light-absorptive antireflection multilayer film comprising:

a light-absorptive film formed on the first surface side and containing pigment microparticles, an antireflection multilayer film formed on the second surface side and contacting the light-absorptive film, and at least one electroconductive thin film included in the antireflection multilayer film.

27. A display device as set forth in claim 26, wherein a surface of the display unit is substantially flat.

* * * * *